Patented May 15, 1951

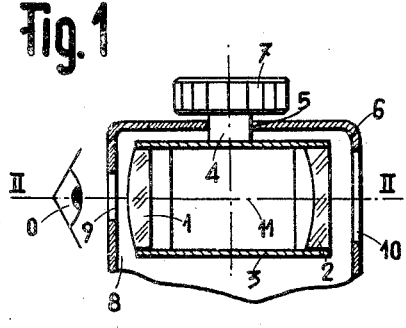
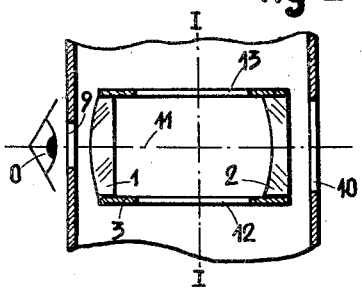
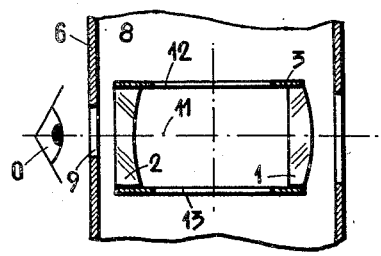
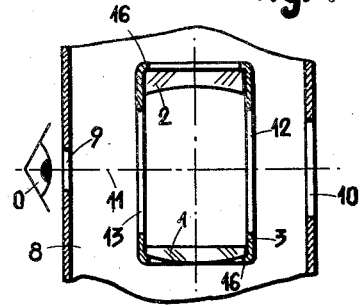
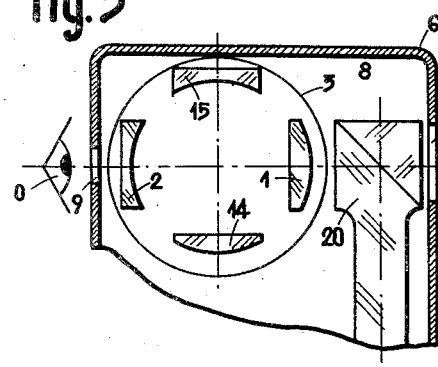
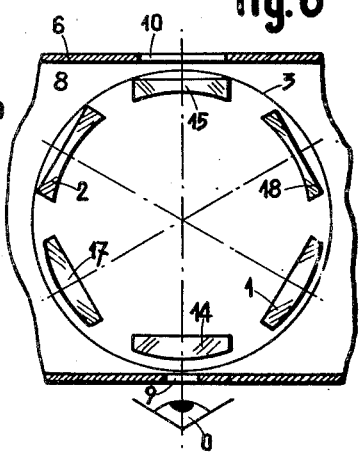
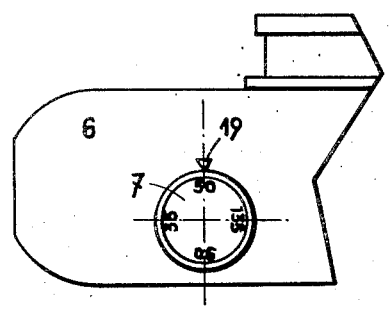

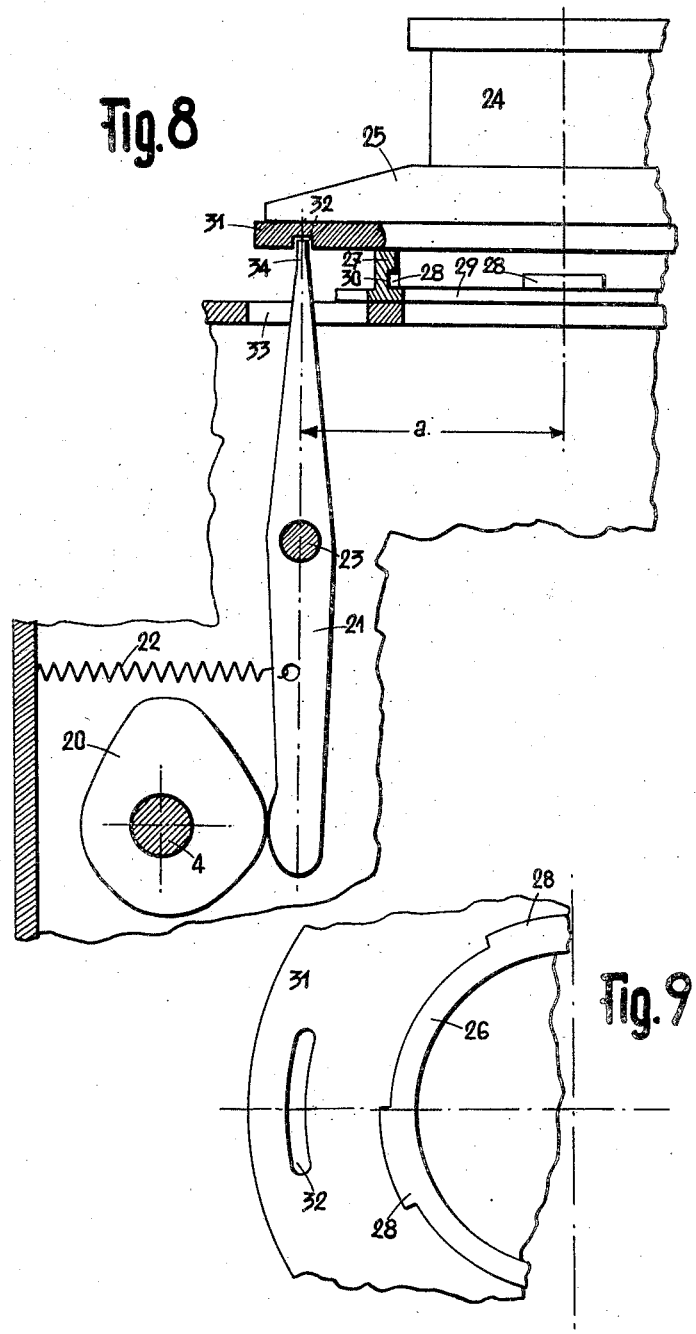

2,552,940

UNITED STATES PATENT OFFICE 2,552,940

VIEWING DEVICE FOR PHOTOGRAPHIC APPARATUS AND CINEMATOGRAPHIC CAMERAS

André-Robert Cornut, Ballaigues, Switzerland, assignor to Pignons S. A. Ballaigues, a corporation of Switzerland Application September 12, 1947, Serial No. 773,576
In Switzerland May 30, 1947

3 Claims. (Cl. 88—1.5)

In the majority of existing photographic apparatus and cinematographic cameras, the subject to be photographed is viewed through a view finder of the inverted Galilean telescope type. The view finder is so constructed as to embrace a field corresponding with that embraced by the camera lens of the apparatus.

However, apparatus with interchangeable camera lenses of different focal length imposes predetermined delicate problems which have not been solved in a satisfactory manner up to the present time. In fact as the photographic camera is adapted to receive camera lenses of different focal distances and thus having different angles of field, it is necessary to make the field of the view finder correspond with that of the camera lens used.

Actually four different devices are used for adapting the field of the view finder to that of the camera lens.

1. The field of the view finder is fixed and corresponds with the field of the camera lens having the shortest focal length. The fields of each of the other camera lenses capable of being used in the camera, are defined by rectangles engraved on the lens of the view finder. This device, however, is only used very little as, on the one hand it is not possible to define in this manner more than two or three different fields, and on the other hand, it is difficult to produce a device of this character, in which the eye of the user can see clearly its marks simultaneously with the object to be photographed.

2. The field of the view finder is so modified by removable masks as to correspond with the field of the camera lens in use on the apparatus. As in case 1, the view finder should be so constructed that its total field corresponds with that of the camera lens of the greatest field of view. Thus the image seen by the eye is reduced and the view finder appears to move the objects further away. The masks or smaller frames fixing the limits of the field in such a manner that the images seen correspond with those reproduced by the camera lenses of longer focal length only effect the reduction of the field of the view finder without modifying the scale of the image seen in the view finder. It thus follows that in the case of such a view finder applied to a camera lens of long focal length, the user only sees in the view finder an image to a small scale and appearing to be very far away.

3. Interchangeable view finders corresponding with interchangeable camera lenses. From an optical point of view this solution is good but from a practical point of view it has the disadvantage of compelling the user to carry with him, in addition to the set of interchangeable camera lenses, a set of interchangeable view finders. Thus for the user, these are additional accessories to be transported, which is translated by a relatively large increase in volume of the case for the photographic camera.

4. Some manufacturers, particularly manufacturers of cinematographic camera, have provided their camera with multi-focal view finders comprising a number of lenses (generally 3 or 4) of which some are mounted rigidly on the apparatus, whilst others are movable. In these view finders, the mask fixing the field of the view finder is secured rigidly to the framework of the apparatus so that according to the position of the movable lenses used in combination with the stationary lenses, the scale of the image reproduced, in the opening, of invariable dimensions, in the mask, increases or diminishes. From an optical point of view, this solution is good, but it has some difficulties in a constructional respect, particularly in the case of photographic camera, in which the view finder cannot have a length exceeding 30 to 40 mm. In the case of cinematographic apparatus in which the view finder, without inconvenience, may have lengths of 100 to 120 mm., the construction of these view finders does not involve any great constructional difficulties.

The present invention has for its subject a view finder for a photographic or cinematographic camera with interchangeable camera lenses of different focal lengths and provided with a viewing opening in opposite walls of a frame secured rigidly to the framework of the camera. This view finder tends to eliminate the disadvantages, referred to above, by the fact that it is provided with at least one Galilean telescope lens pivoted in the framework of the apparatus about an axis perpendicular to the viewing axis and used either as magnifying telescope or in a reversed position as a reducing device.

Some forms of construction of the view finder, forming the subject of the invention are shown diagrammatically and by way of example in the accompanying drawings, wherein:

Fig. 1 is a sectional view on the line I—I of Fig. 2 of a first form of construction of the view finder.

Fig. 2 is a sectional view on the line II—II of Fig. 1.

Figs. 3 and 4 are sectional views similar to that in Fig. 2 for different positions of the view finder.

Fig. 5 is a sectional view of a second form of construction of the view finder.

Fig. 6 is a sectional view of a third form of construction of the view finder.

Fig. 7 is a partial outside view of the apparatus.

Fig. 8 is a partial sectional view of the apparatus showing a locking device.

Fig. 9 is a partial view from underneath of an interchangeable camera lens.

According to the form of construction shown in Figs. 1 to 4, the view finder is provided with a Galilean telescope having lenses 1 and 2 mounted in a support 3. The latter is provided with a pivot 4 rotating in a bearing 5 provided in the framework 6 of a photographic apparatus or of a cinematographic camera. The end of the pivot 4 carries an operating member 7 accessible from the outside whilst the Galilean telescope is located within a chamber 8 defined by the framework and having a viewing opening 9 and an opening 10 forming a mask or frame limiting the field of the image. The openings 9 and 10 are co-axial and centered on the viewing axis 11. Finally the pivotal axis of the support 3 is perpendicular to the viewing axis 11. The operation of the view finder above described is as follows:

By operating the member 7, the user has the possibility of bringing the optical axis of the Galilean telescope into the viewing axis 11 (Figs. 1, 2 and 3). As shown in the drawing, the support 3 may be brought into two different positions located at 180° from one another. For the first of these positions (Figs. 1 and 2) the Galilean telescope reduces the image X times for example. Thus the observer placing his eye 0 in front of the viewing opening 9, sees the image of the object to be photographed reduced X times. This image is so limited by the mark or frame 10 as to correspond with the field of the camera lens in use.

For the second position of the support 3, the Galilean telescope (Fig. 3) magnifies the image X times so that the observer sees the image of the object to be photographed magnified X times and limited by the frame 10. The angle of field is therefore smaller and the image limited by the frame 10 thus corresponds with the field of a camera lens of greater focal length than the first camera lens.

Thus by judiciously selecting the lenses of the Galilean telescope it is possible to effect that the image seen through the view finder and limited by the frame 10 corresponds for the first position of the support 3 to the field of a first camera lens, and for the second position of the support 3 with the field of a second camera lens placed on the apparatus.

In the form of construction shown in Figs. 2 to 4, the support 3 may also occupy a third position in which the optical axis of the Galilean telescope is perpendicular to the viewing axis 11. The support 3 has two co-axial openings 12 and 13 so provided that for this third position of the support 3, they are centered on the viewing axis 11.

It will at once be seen that for this third position of the support, the observer sees directly through the openings 9, 10, 12, 13, the object to be photographed, the opening 10 limiting the visible field. Thus for this third position of the support 3, the visible field corresponds with that of a third camera lens of an intermediate focal length capable of being used in the camera.

In some cases and according to the respective values of the three focal lengths of the interchangeable camera lenses, it is not always possible to so arrange that the opening 10 limits an image corresponding exactly with that reproduced by the camera lens. It is then possible, as shown in Fig. 4, to provide the Galilean telescope with masks 16 limiting a field smaller than that limited by the frame 10 and corresponding exactly with the field of the corresponding interchangeable camera lenses.

In the form of construction shown in Fig. 5, the support 3 is provided with four lenses 1, 2 and 14, 15 forming two Galilean telescopes located with their optical axes perpendicularly relatively to one another. The support may then be brought into four different positions for each of which the observer sees in the view finder an image corresponding with that of one of the four interchangeable camera lenses capable of being placed on the apparatus.

The view finder, forming the subject of the invention, may as shown in Fig. 5, be coupled to a range finder 20. The latter may have a prismatic base such as is shown in Fig. 5 or of any other known type. In this case, the frame 10 is located in front of the prism of the range finder, which from an optical point of view is advantageous, as the more the frame is removed from the lens, the more clearly will this appear to the observer, and the more easily is the accommodation effected.

In the form of construction shown in Fig. 6, the support 3 is provided with six lenses 1, 2, 14, 15, 17, 18 forming three Galilean telescopes. Such a support can be placed in six different positions, enabling a view finder to be constructed having six different fields each corresponding with the field of one of the six interchangeable camera lenses of different focal lengths, capable of being used in the camera. It is clear that such a view finder is of greater size than that shown in Figs. 1 to 4, so that it is particularly advantageous and practical for cinematographic cameras, in which the space available for the view finder is less reduced than in the case of photographic camera.

Fig. 7 is a partial outside view of the apparatus showing the operating member 7 in front view. The latter is provided on its front face with marks indicating the focal length of the camera lenses which can be used in the camera. A mark 19 secured to the framework of the apparatus enables the position of the support 3 to be marked for which the field of the view finder corresponds with that of the camera lens used.

Figs. 8 and 9 show diagrammatically a locking device preventing the placing in position in the camera an objective of a given focal length as long as the operating member of the view finder is not placed in a position for which the field of the view finder corresponds with that of the said camera lens. For this purpose the pivot 4 carrying the operating member 7 and the support 3 of the Galilean telescope, is provided with a cam 20 secured rigidly thereto. A lever 21, pivoted on a spindle 23, secured to the framework of the apparatus, is subjected to the action of a spring 22. The latter tends to hold one of the ends of the lever 21 in contact with the profile of the cam 20.

The interchangeable camera lenses 24, of which only one is shown, are each provided with a mounting 25 adapted to permit of their easy and rapid securing to the framework of the apparatus. In the form of construction shown in Figs. 8 and 9, the securing device for the mounting 25 on the apparatus is assumed to be a bayonet device. The mounting 25 has a cylindrical body 26 adapted to be engaged with a corresponding bore 29 provided in a sleeve 27 secured rigidly to the apparatus. The cylindrical body 26 has projecting parts 28, whilst the bore 29 of the sleeve has recesses (not shown) providing a passage for these projecting parts 28. The latter are adapted to be engaged with seatings 30 in the form of an arc of a circle. The mounting also has a collar 31 in the inner face of which is provided a groove 32, in the form of an arc of a circle concentric with the optical axis of the camera lens. The groove in collar 31 of a lens mount has a radius differing from the groove radius of any other lens mount. The free end 34 of the lever 21 emerges from the front face of the apparatus through an opening 33 provided in the front wall of the apparatus.

The operation of the locking device described is as follows:

When the user actuates the operating member 7, for the purpose of bringing the support 3 into a position for which the field of the view finder corresponds with that of the desired camera lens, he produces rotation of the cam 20. The latter co-operating with one of the ends of the lever 21, produces movements of the free end of this in a radial plane containing the axis of the bore 29. Thus with each position of the operating member 7 corersponds a position of the cam 20 and thus a determined distance $a$ between the end 24 of the lever 21 and the axis of the bore 29. It thus follows that each position of the view finder corresponds with a defined position of the end 34 of the lever 21. In order to enable a camera lens to be mounted on the apparatus, it is necessary for the end 34 of the lever 21 to engage with the groove 32 provided in the collar of the mounting of the camera lens.

Thus only the camera lens of which the groove 32 is according to a radius equal to the distance $a$ corresponding with the distance of the end 34 of the lever from the axis 29, can be secured to the apparatus.

From the foregoing it will be seen that the locking device described prevents any error on the part of the user in the selecting of the position of the view finder corresponding with the desired camera lens. It will be understood that other locking devices may be provided for preventing a faulty operation by the user, the device above described being given solely by way of example, but is capable, in a modified form of construction of being replaced by any known locking device enabling the desired end to be obtained.

Some forms of construction of the view finder, forming the subject of the invention, have been described herein by way of example and with reference to the accompanying diagrammatic drawing, but it will be understood that all the members and elements described may be replaced by their equivalents. For example it is possible to provide a support 3, provided with more than three direct and reversed Galilean telescopes. It is also possible to define the positions of use of the support 3 by means of a spring actuated plunger which cooperates with recesses in the support, or by any other automatic locking device enabling the position of the support 3 to be fixed during the viewing operation.

For completing the range of the fields of the view finder corresponding with the various fields of the interchangeable camera lenses, one or more coloured frames may be drawn on one or more lenses of one or more of the Galilean telescopes with which the view finder is provided.

I claim:

1. In a photographic apparatus with interchangeable lenses, the combination, comprising, a framework having a viewing opening and a limiting opening coaxial therewith, a support mounted in the framework for rotation about an axis perpendicular to the viewing axis, at least one Galilean telescope carried by the support and including at least a direct enlarging lens and a reversed reducing lens coaxial therewith, the support being rotatable to a position coinciding the lens axis with the viewing axis, a lens mount for receiving any one of a plurality of interchangeable objectives each fitting the lens mount and each structurally distinguished from each of the other objectives and each having a field corresponding to that of a lens of the Galilean telescope, the structural distinctions of the objectives corresponding to their focal lengths, and means operable with the support and in a given position interfittingly engaging the distinguishing structure of a selected objective only and lying in the path of the distinguishing structure of any other objective not corresponding to the angular position of the support and thereby preventing the mounting of such other objective.

2. The combination according to claim 1, wherein, the means operable with the support including a lever interfitting the structural distinction of one lens only.

3. The combination according to claim 2, wherein, the means operable with the support further includes a cam rigid therewith and co-operating with the lever, and a spring urging the lever against the cam and holding the support in the selected position.

ANDRÉ CORNUT.

REFERENCES CITED

The following references are of record in the file of this patent:

UNITED STATES PATENTS

| Number | Name | Date |
|---|---|---|
| 1,689,268 | Wittel | Oct. 30, 1928 |
| 1,795,490 | Howell | Mar. 10, 1931 |
| 1,897,268 | Merle | Feb. 14, 1933 |
| 2,147,259 | Kuppenbender | Feb. 14, 1939 |
| 2,187,246 | Nerwin | Jan. 16, 1940 |
| 2,437,032 | Kaprelian | Mar. 2, 1948 |

FOREIGN PATENTS

| Number | Country | Date |
|---|---|---|
| 351,484 | Great Britain | June 26, 1931 |
| 368,603 | Great Britain | Mar. 10, 1932 |